United States Patent
Hubbard

[11] Patent Number: 5,927,255
[45] Date of Patent: Jul. 27, 1999

[54] METHOD OF USING FUEL IN AN ENGINE

[76] Inventor: William A. Hubbard, 33 Alderman Ct., Timonium, Md. 21093

[21] Appl. No.: 08/937,708

[22] Filed: Sep. 26, 1997

[51] Int. Cl.$^6$ .................................................... F02M 31/00
[52] U.S. Cl. ........................................... 123/543; 123/544
[58] Field of Search .................................. 123/544, 549, 123/557, 1 A, 543, 545, 546, 547, 179.21

[56] References Cited

U.S. PATENT DOCUMENTS

| | | | |
|---|---|---|---|
| 4,325,345 | 4/1982 | Wilkinson et al. | 123/549 |
| 4,375,799 | 3/1983 | Swanson | 123/549 |
| 4,955,332 | 9/1990 | Talbert | 123/557 |
| 4,958,598 | 9/1990 | Fosseen | 123/1 A |
| 5,042,447 | 8/1991 | Stone | 123/541 |
| 5,115,787 | 5/1992 | von Pickartz | 123/549 |
| 5,119,794 | 6/1992 | Kushida et al. | 123/549 |
| 5,533,486 | 7/1996 | Qutub | 123/541 |
| 5,558,069 | 9/1996 | Stay | 123/541 |

*Primary Examiner*—Marguerite McMahon
*Attorney, Agent, or Firm*—Leonard Bloom

[57] ABSTRACT

A method of using a petroleum based fuel in an internal combustion gasoline engine. The fuel has a flash point of at least 100° F. and the fuel is heated, within the engine, to a temperature above 100° F. The heated fuel is introduced into the cylinders in the engine and ignited within the cylinder to start the engine. The heat source is removed after the engine has become warm.

14 Claims, 8 Drawing Sheets

PRIOR ART

METHOD OF USING FUEL IN AN ENGINE

BACKGROUND OF THE INVENTION

The present invention relates to a method of using fuel in an engine and more particularly to a heated fuel having a flash point over 100° F.

The gasoline internal combustion engine is designed to utilize a fuel with a flash point of approximately −40° F. to −50° F. The fuel is mixed with air in a carburetor and passed to the cylinder, or is introduced by an injector into the cylinder, where a spark plug is timed to generate a spark to ignite the fuel/air mixture. Other engines such as diesel engines and jet airplane engines use a fuel with a higher flash point of up to 150° F. The low flash point of gasoline is a major source of approximately 10,000 automobile fires per year in the United States. Also, gasoline contributes significantly to atmospheric pollution while the gasoline is being pumped into the fuel tank.

The ability to use fuels having a flash point of at least 100° with gasoline-type internal combustion engines would provide significant economical and environmental benefits. Starting at the refinery, producers would not need to fractionate the crude petroleum to the same extent. This would result in savings in cost to the refiner. There would be fewer types of fuel required and the need for storage of many different fuels would be reduced. A single fuel would be available for a broad spectrum of vehicles and engines. There would be fewer fires and consequently there would be fewer human injuries and insurance costs could be reduced.

BRIEF SUMMARY OF THE INVENTION

It is an object of the present invention to provide a method wherein fuel with a flash point of at least 100° F. can be used in a gasoline engine.

It is a further object of the present invention to provide a method wherein a single fuel may be used in a broad spectrum of engines to power vehicles thereby significantly reducing the types of fuel on the market and effecting substantial cost savings in supply, storage and logistics.

It is yet another object of the present invention to provide a fuel which has a higher flash point than gasoline and which will therefore, be safer to use.

In accordance with the teachings of the present invention, there is disclosed a method of using a petroleum based fuel in a gasoline engine having a plurality of cylinders. The petroleum based fuel having a flash point of at least 100° F. is provided. A means is provided within the engine, to heat the fuel above 100° F. The fuel is heated in the fuel path and the heated fuel is introduced into the cylinders in the engine. The fuel is ignited within the cylinders to start the engine and the heat from the fuel line is removed after the engine has become warm.

These and other objects of the present invention will become apparent from a reading of the following specification taken in conjunction with the enclosed drawings.

DESCRIPTION

Figure 1:
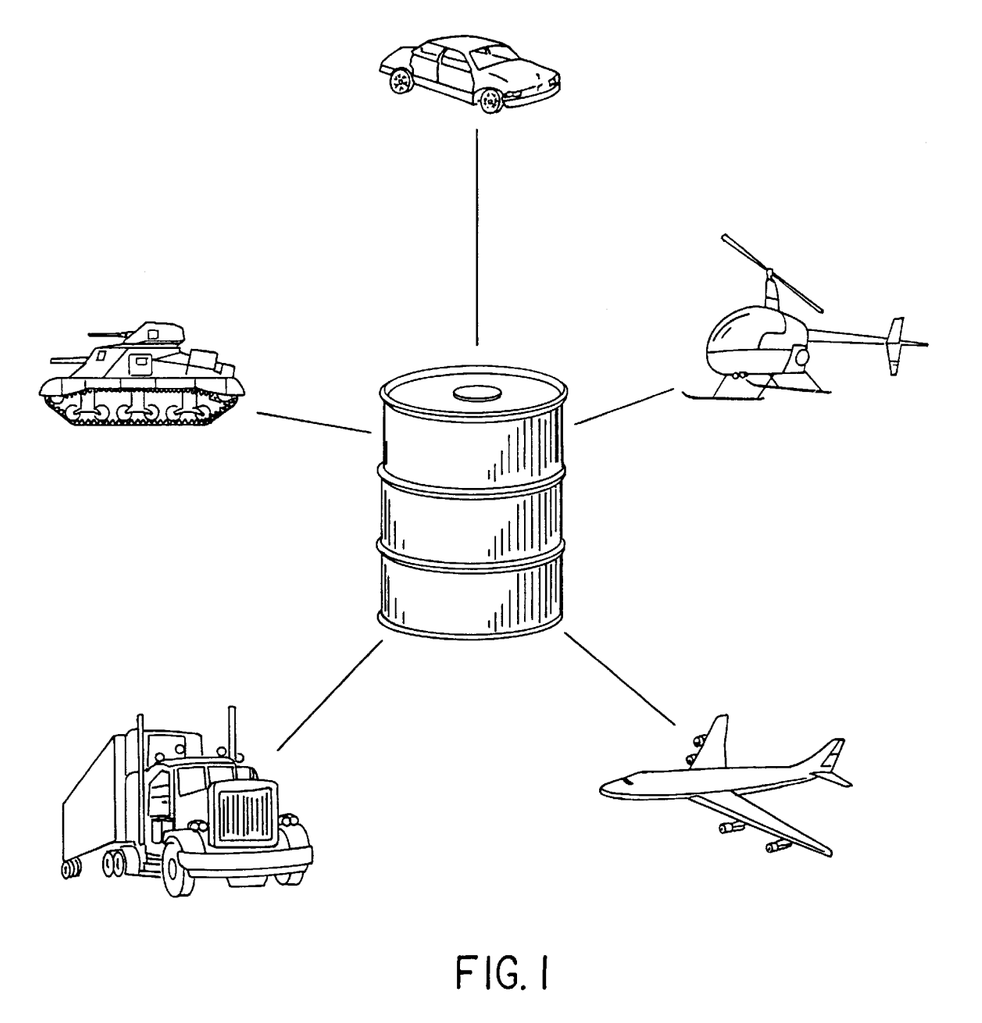
FIG. 1 is a diagram showing the plurality of vehicles in which the fuel of the present invention may be used.

Referring now to FIG. 1, the fuel of the present invention may be used with a wide variety of vehicles. As will be described, a gasoline internal combustion engine as found in automobiles can be used with the fuel. Also, the fuel can be used to operate the engines of trucks, helicopters, tanks and jet airplanes.

Figure 2:
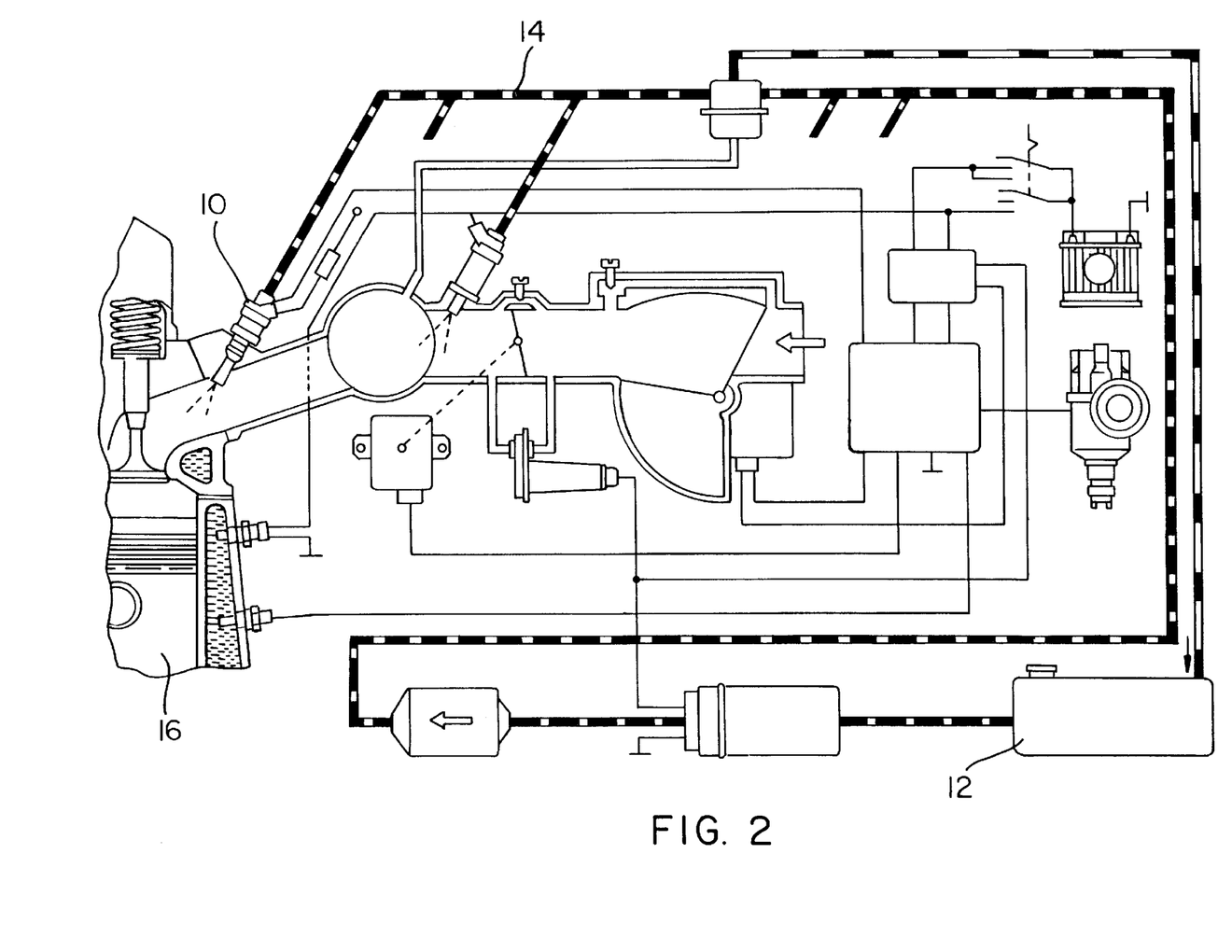
FIG. 2 is a diagram of the fuel system in a vehicle without a carburetor.
Figure 3:
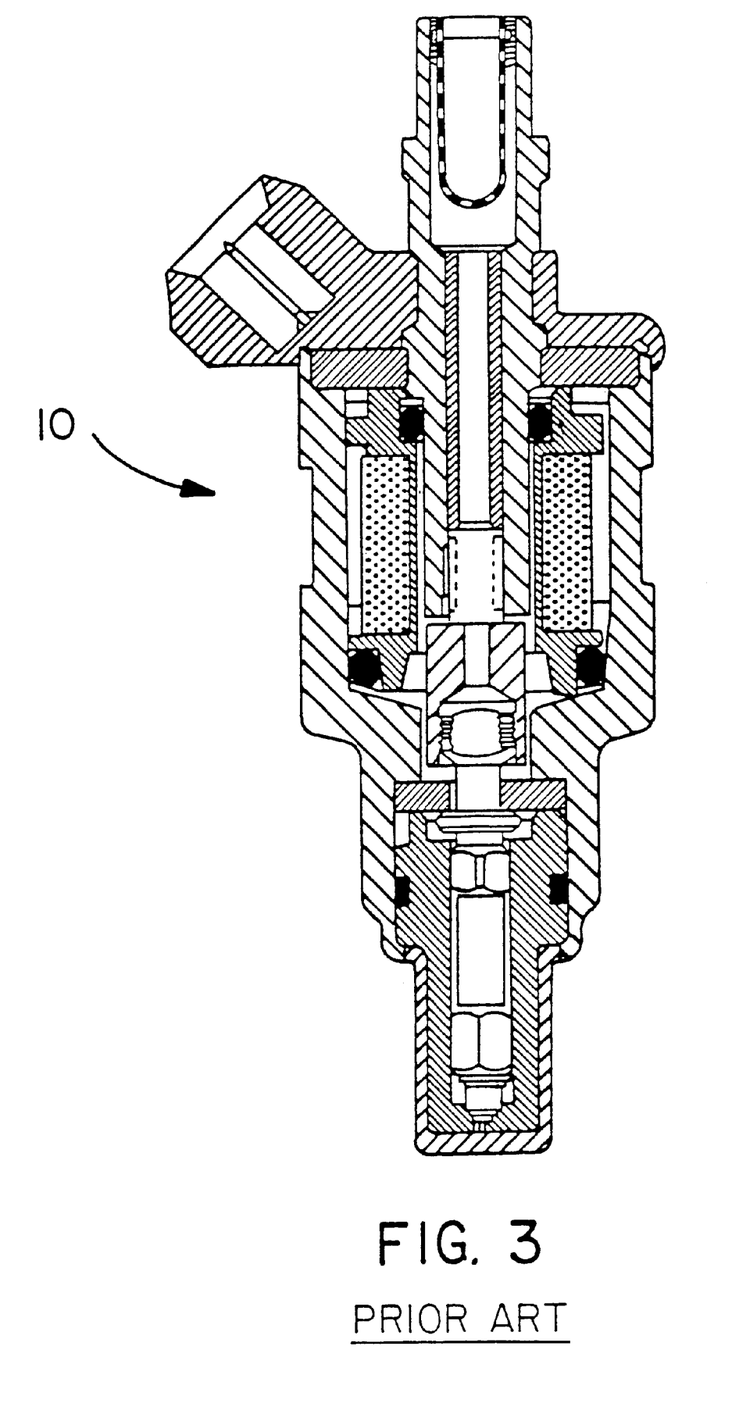
FIG. 3 is an enlarged cross-sectional view of the fuel injector of the prior art.
Figure 4:
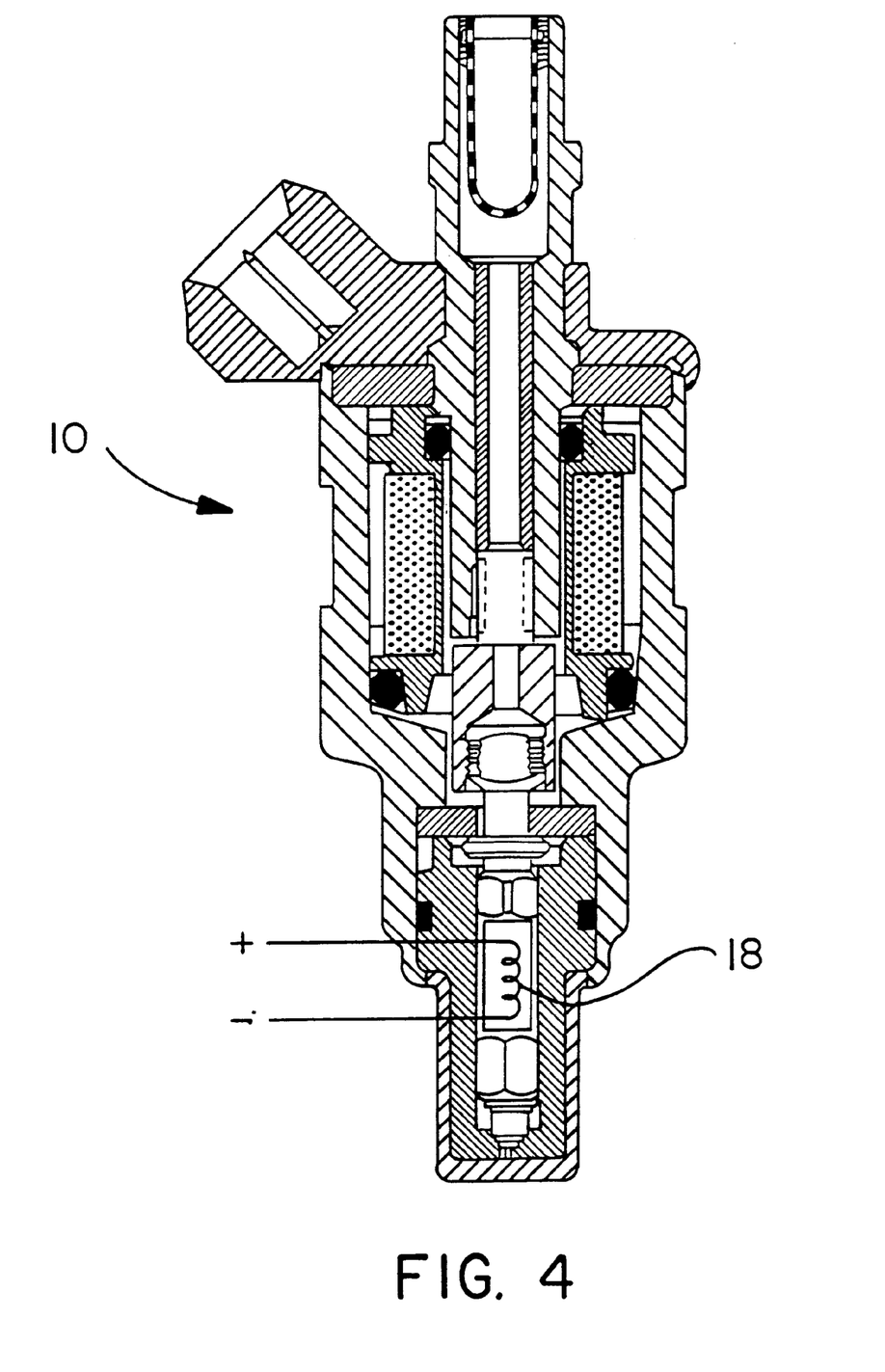
FIG. 4 is an enlarged cross-section view of FIG. 3 showing the present invention having heating means disposed in the fuel injector.

In those vehicles which do not have a carburetor (FIG. 2), the fuel injector 10 is used to introduce fuel into the cylinders of the engine. The fuel is stored in a fuel tank 12 and pumped through fuel lines 14, to the fuel injector 10 and into the cylinders 16 of the engine. A means for heating the fuel 18 is disposed in the fuel path and preferably in the fuel injector 10 (FIG. 4). The heating means 18 may be an electrically heated resistance wire in the shape of a coil, a grid or other form which may be disposed in the fuel injector 10. In this manner, the fuel is heated just prior to being injected into the cylinder port. Other heating means including spark plugs (as will be described) and means known to persons skilled in the art may be used. The heating means must be capable of heating the fuel above 100° F. or above the flash point of the fuel if the flash point of the fuel is higher than 100° F. Preferably, the fuel has an initial boiling point (ASTM D 86) high enough so that the flash point is above 100° F. and this initial boiling point is approximately 315° F. The dry point (ASTM D 86) is close to, or slightly higher than, the normal value for gasoline, which is approximately 400° F.–425° F. With heated fuel and fuel injection, the dry point may be as high as 575° F.

Figure 5:
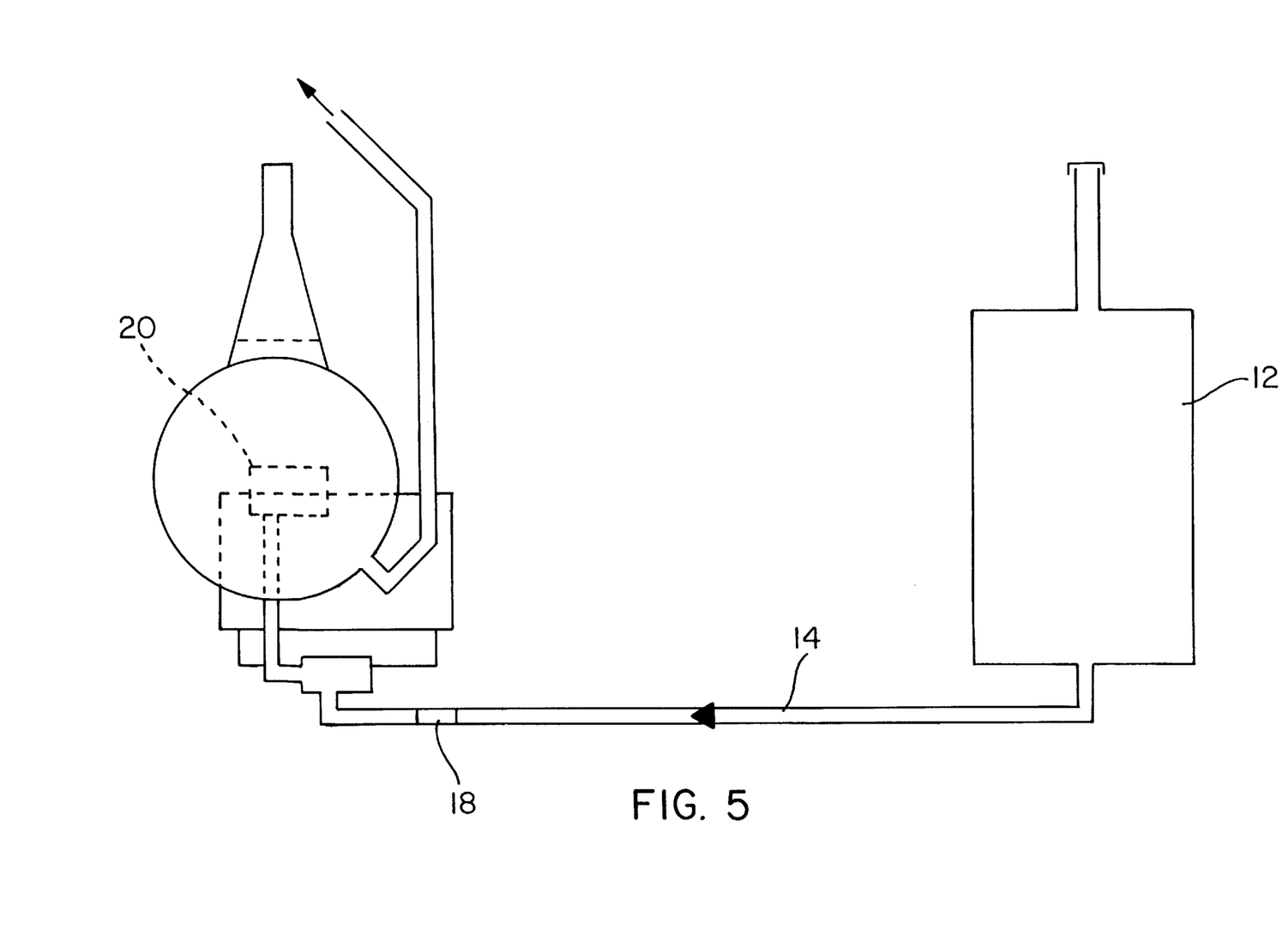
FIG. 5 is a diagram of the fuel system of a vehicle with a carburetor.

In those vehicles having a carburetor (FIG. 5), the fuel is pumped from the fuel tank 12, through the fuel path 14 to the carburetor 20 and into the engine cylinder 16. Prior to entering the carburetor 20, it is preferred that the fuel is heated by the above described heating means 18. A combination of heating means such as an electrically heated resistance and a spark plug may be used.

The function of the heating means 18 is to elevate the fuel over the flash point of the fuel and to enable the fuel to ignite in the cylinder of the vehicle because the engine cannot start until the fuel is at a temperature exceeding the flash point of the fuel. With a fuel such as gasoline, the flash point is very low (approximately −40° F. to −50° F.) due to the butane and other volatile components present. After the engine has operated a relatively brief period of time, the engine is warm and the cylinder is at a temperature exceeding the flash point of the fuel. The heating means may then be removed or inactivated so as to no longer heat the fuel prior to introducing the fuel into the cylinder. Care must be taken not to heat the fuel above its autoignition temperature since this would cause the fuel to burn before the spark plug fires. The autoignition temperature varies for different fuels, but, for the present invention is above 400° F.

Only a small volume of fuel, approximately 0.002 ml per cylinder, would have to be heated at one time so that heating can occur rapidly. The heating cycle is controlled electronically and is connected to a temperature monitor. When the engine temperature rises to a predetermined value, the heating is discontinued. The heating may be produced in the fuel injector, the fuel rail or a location between these. It is preferred that the heating be performed as close to the cylinder as possible to reduce the amount of fuel which requires heating. This is especially important when the fuel is used in an engine with a carburetor engine. The fuel may be heated to a temperature higher than the flash point to compensate for the fuel's cooling in route to the cylinders. Vehicles having engines with carburetors or with fuel injection may be retrofit to use the fuel and method of the present invention.

Figure 6:
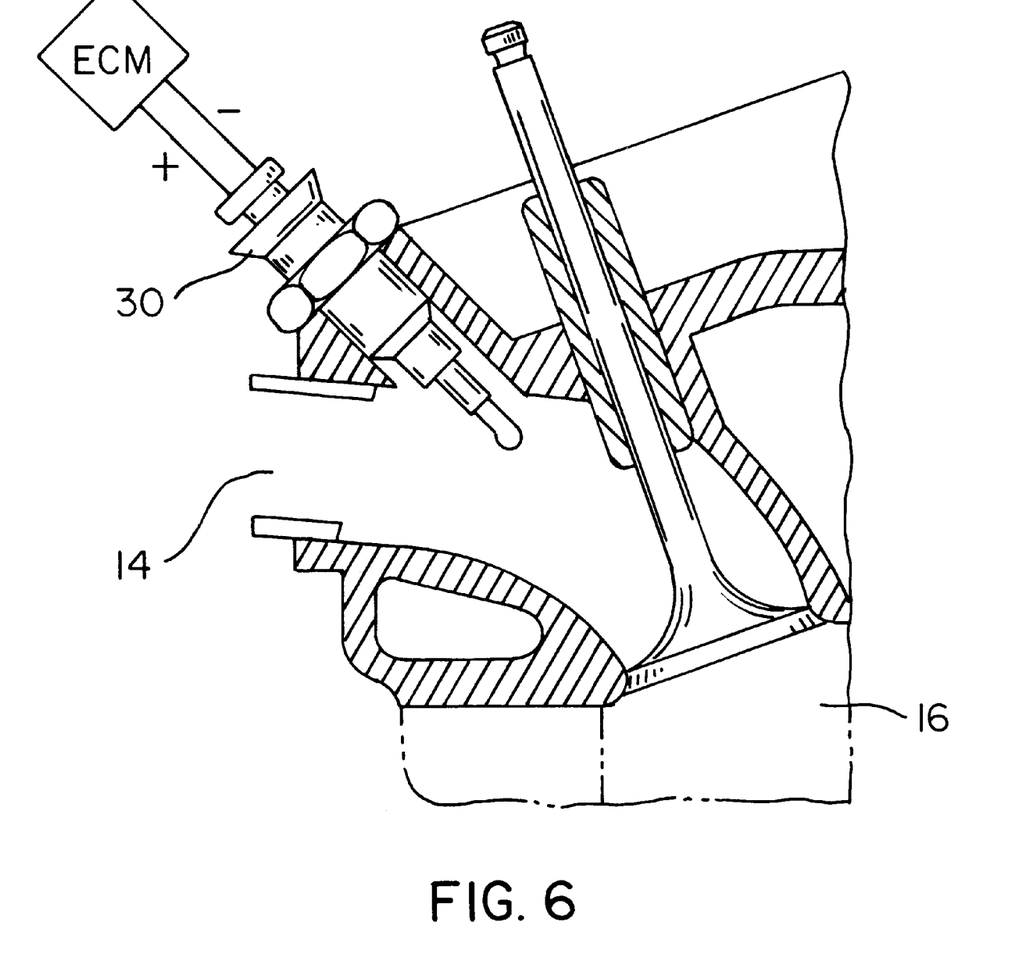
FIG. 6 is a diagram of a fuel system of a vehicle with a glow plug.

Another heating means for the fuel is the inclusion of a glow plug in each cylinder in a manner similar to a diesel engine (FIG. 6). The glow plug may be heated when the engine is to be started and, after a brief heating period, is available to heat the fuel within the cylinder or as it enters the cylinder. As in a diesel engine, the glow plug is kept warm only until the engine has become warm and the power to the glow plug is disconnected. Diesel glow plugs are heated as high as 1500° F. to start a diesel engine. This is above the autoignition temperature of Lhe fuel of the present invention and, if heated to this temperature, would cause premature ignition. A glow plug temperature of 400° F.–500° F. is satisfactory. The glow plug may be used for starting in conjunction with a spark plug and a preheater for the fuel in the fuel line wherein, after initial heating above the flash point, the warm engine and the heated fuel line are sufficient to permit continuing functioning of the engine with the fuel having a flash point over 100° F.

Virtually all gasoline engines will start and run well on a suitable fuel with a flash point as high as 150° F. providing that the engine has been warmed up. The only reason for the very low flash point of gasoline is so that the engine will start when it is cold and particularly in cold weather. The temperature of the engine is monitored by the Electronic Control Module (ECM) in most modern engines with fuel injection. This ECM could easily be modified to include control of the fuel heating. The automatic choke is sometimes controlled by the ECM or a separate thermostat. This could also be modified to control the fuel heating.

The fuel of the present invention is preferably petroleum based with the following characteristics:

1. Flash point above 100° F. (ASTM D 56).
2. Initial boiling point (ASTM D 86) consistent with the flash point.
3. Dry Point (ASTM D 86) generally in the gasoline foiling range and no higher than 425° F. for engines with carburetors. With a heated fuel and with fuel injection, the dry point could be raised much higher to 575° F.
4. An octane number high enough to be satisfactory in normal engines. A special engine adapted to use a lower octane rating might be required. This could be particularly true for military use.
5. A cetane number high enough to be used in normal diesel engines. Again, a special engine might be required in order to use a lower cetane rating. This would particularly apply to military use. Since cetane ratings tend tc decline as octane ratings rise, and vice versa, a compromise is required at levels somewhat lower than optimum in order to obtain with a fuel that can be used to replace both gasoline and diesel fuel. Specially designed engines might be required in order to use this compromise fuel.
6. The aromatic content should be low enough (probably below 35%) so that excessive smoke would not be generated in jet engine use. For jet engines, the octane and cetane ratings would be irrelevant.
7. The fuel may contain from 0% to 25% of an oxygenated component such as amyl alcohol which has a flash point above 100° F. This added oxygen in the fuel provides a cleaner burning fuel. In addition, the amyl alcohol or higher alcohols could combine with the aromatics in the fuel to form a "co-solvent" which has the ability to dissolve gums that tend to build up in engines through the use of gasoline. Other oxygenated petrochemicals which may be used would be alcohols with 6 carbons or more, and ethers similar to TAME (tertiary amyl methyl ether) or MTBE (methyl tertiary butyl ether) as long as the flash point is high enough. Other more expensive oxygenated materials that might possibly be used would include dimethyl formamide (flash point=135° F.), cyclohexanol (flash point=154° F.) and 2-ethyl hexanol (flash point=166° F.). It is possible that some of the higher boiling ketones and esters could be used if they didn't damage the rubber and plastic components in the fuel system. These could include cyclohexanone, diacetone alcohol, diisobutyl ketone, ethyl butyl ketone and 2-ethyl hexyl acetate. A number of ethylene and propylene glycol based materials may be satisfactory, however, due to questionable stability in storage, these compounds should be avoided.

Figure 7:
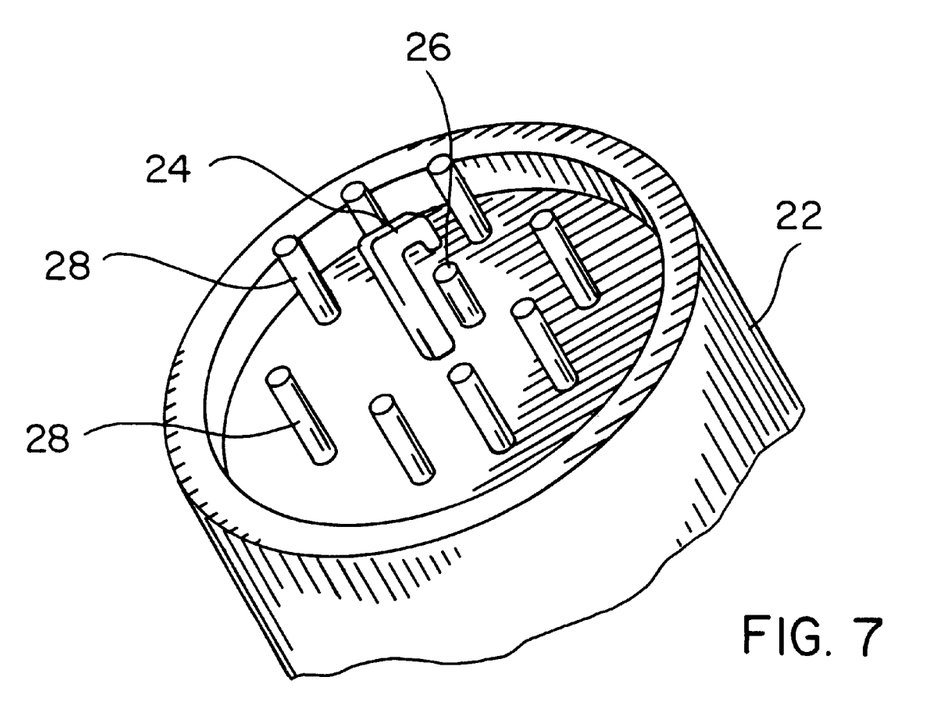
FIG. 7 is an enlarged perspective view of the electrodes on a spark plug in the elevated position.
Figure 8:
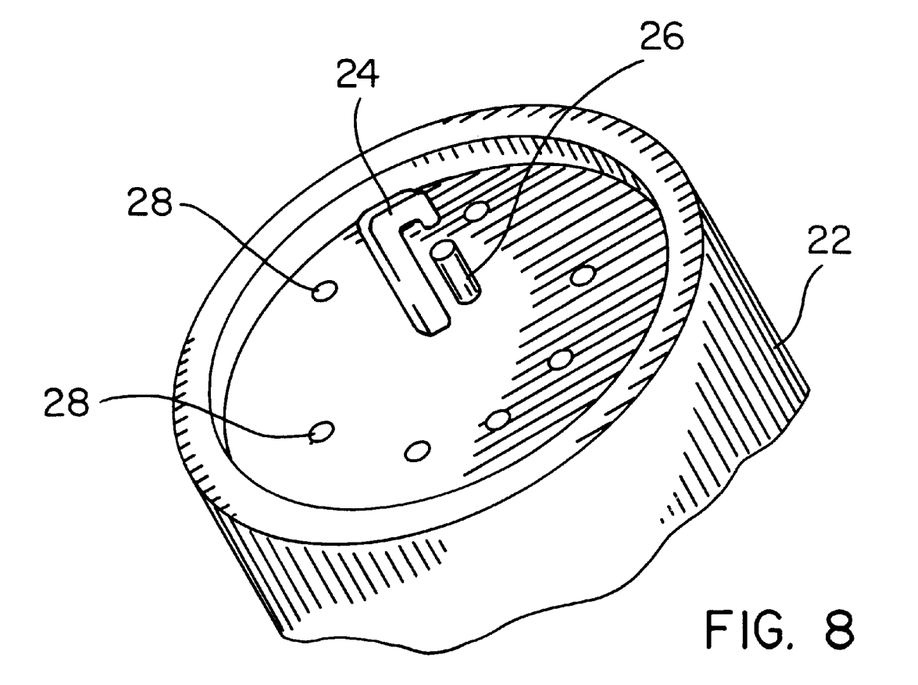
FIG. 8 is the spark plug of FIG. 7 with the electrodes retracted.
Figure 9:
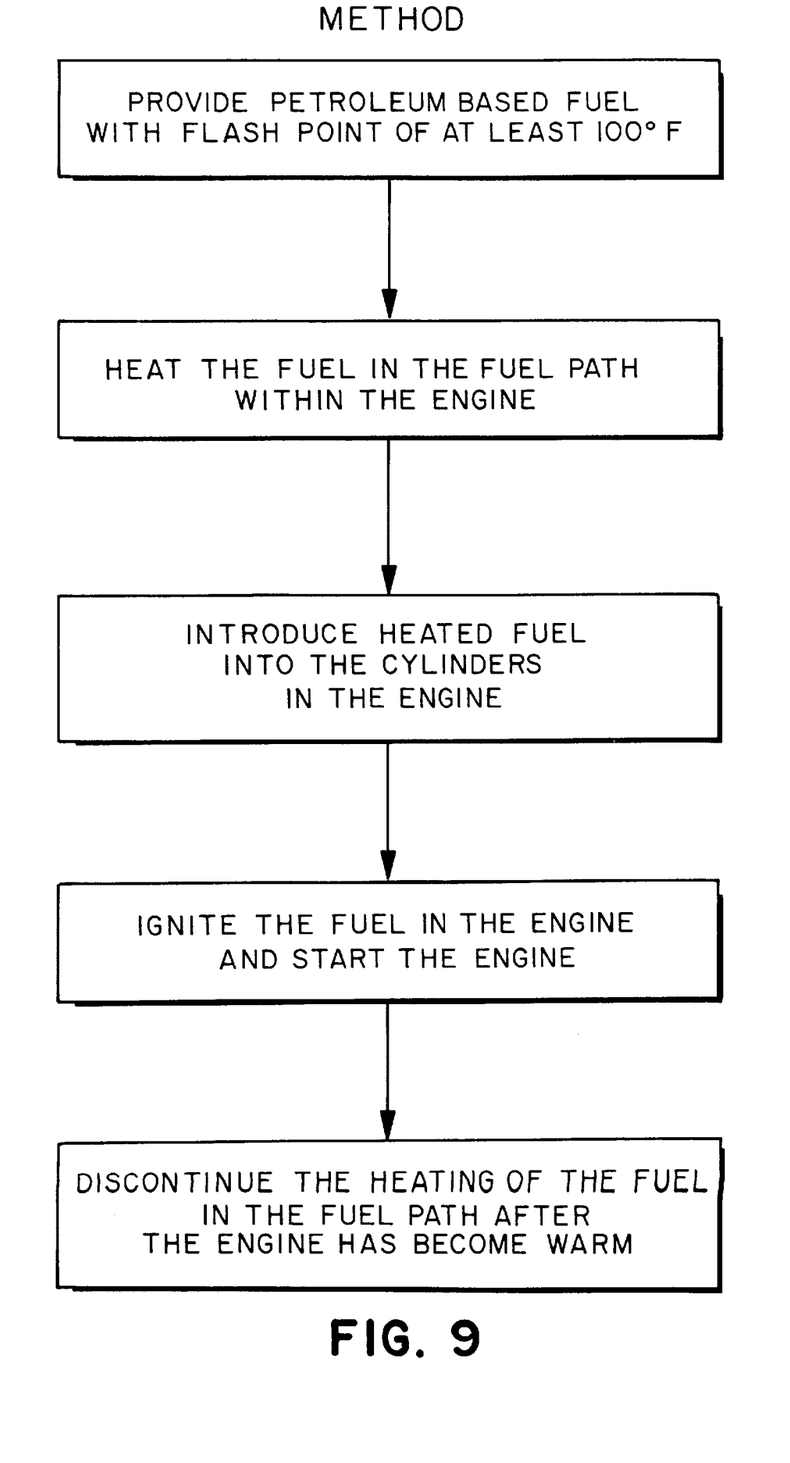
FIG. 9 is a flow diagram showing the method of the present invention.

Referring to FIGS. 7 and 8, one way to heat the fuel-air mixture inside the cylinder head is to generate a huge spark which would heat the fuel above its flash point. FIG. 7 shows that the electrodes on the spark plug 22 may include not only the conventional center electrode 24 with adjacent electrode 26 with a gap separating the two electrodes, but further has a plurality of retractable electrodes 28 disposed circumferentially of the center electrode 24 and separated from the center electrode 24. When the engine is to be started, the retractable electrodes 28 are elevated and the adjacent electrode 26 is shut off electrically. The ignition coil generates up to 40,000 volts sufficient for the spark to jump the gap from the center electrode 24 to the retractable electrodes 28. After the engine has started and has warmed up, the retractable electrodes 28 are retracted, as shown in FIG. 8, by a solenoid (not shown) and the adjacent electrode 26 is electrically reconnected so that the spark passes between the center electrode 24 and the adjacent electrode 26. Because the engine is warmed to a temperature above the flash point of the fuel, the retractable electrodes 28 are not needed to ignite the fuel.

In another embodiment, for start up of the engine, the two center electrodes 24 and 26 in FIG. 7 are shut off electrically, the outer electrodes 28 are charged so that each positive electrode has negatively charged electrodes on both sides of it. The electrodes all fire simultaneously and this generates a huge circular spark which is sufficient to heat the fuel to its flash point. Again, after warm up, the outer circle of electrodes are disconnected electrically and retracted while the engine runs on the center electrodes.

In a further embodiment, the outer ring of electrodes 28 are never elevated but are only conductors or electrodes on the face of the plug. For start up, adjacent electrode 26 is disconnected electrically and the other electrodes 28 are used. Thus, the spark jumps from the center electrode 24 to all of the surrounding electrodes 28. Again, this generates a large spark which provides the necessary heating. After warm up, the surrounding electrodes 28 are shut off electrically and alternate electrode 26 is used. This system has the advantage of eliminating moving parts and uses only electrical switching. The retractable electrodes are moved with a solenoid similar to the solenoid used in fuel injectors.

The method of the present invention has value in both military and civilian applications. In military use, it will be possible to use the same fuel for automotive, truck, tank, helicopter, and jet airplane use. This would eliminate the need for gasoline and would greatly reduce logistical problems while eliminating the safety hazard of gasoline in military operations. The original JP-1 fuel has a boiling range of 325° F.–450° F. and a flash point of 120° F. With proper attention to octane number, the JP-1 fuel could serve as the fuel for the present invention. Jet fuel differences in combustion qualities are minor and they can tolerate 20% to 25% aromatics which would help the octane number in an auto engine. JP-5 has been the Navy jet fuel in the past and its boiling range is 350° F. to 500° F. with a flash point of 150° F. This fuel may also serve as the fuel for the present invention. The 400° F. top boiling range for gasoline was put in place while cars all used carburetors and the fuel had to vaporize quickly. With fuel injection engines, this vaporizing is not so important so a 500° F. or 575° F. top boiling range may be used. In fact, diesel engines operate on much heavier and higher-boiling fuels. The fuel Jet-A is a large volume jet fuel for commercial aviation. It has a top boiling range of 575° F. with a flash point of 100° F. This fuel may also serve as the fuel for the present invention. In addition to fueling of planes, jet fuels are also used to cool the lube oils and other engine and plane parts while the fuel is on its way to the jet engines. In this cooling process, the fuel is heated as high as 300° F. or higher. At these temperatures the olefin polymerize to form gums which clog up fuel filters and heat exchangers. As noted above, the fuel containing alcohol, together with the aromatics in the petroleum based portion of the fuel, form a strong solvent to dissolve these gums.

In civilian applications there are about 10,000 automobile fires per year in this country and this could be sharply reduced with a higher flash point fuel. Also, atmospheric pollution while gassing up would be sharply reduced without the use of vacuum systems to collect the butanes and pentanes. There might be cost savings to petroleum refiners by cutting out the light ends and using a boiling range that is higher on the top side.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A method of using a petroleum based fuel in a gasoline engine having a plurality of cylinders comprising the steps of:

providing the petroleum based fuel having a flash point of at least 100° F., and a boiling range of 315° F. through 575° F., providing a means within the engine, for heating the fuel above 100° F., heating the fuel in a fuel path without vaporizing the fuel and introducing the heated fuel into the cylinders in the engine, and igniting the fuel within the cylinders and starting the engine.

2. The method of claim 1, wherein the petroleum based fuel has approximately 0%–25% by weight alcohol added thereto.

3. The method of claim 2, wherein the alcohol has at least 5 carbon atoms and a flash point above 100° F.

4. The method of claim 3, wherein the petroleum based fuel having alcohol therein serves as a solvent and dissolves gum formed in the engine and fuel path.

5. The method of claim 1, wherein the means for heating the fuel is an electrical resistance through which electrical current is passed.

6. The method of claim 1, wherein the means for heating the fuel is a plurality of spark plugs, one spark plug disposed in each cylinder.

7. The method of claim 6, wherein each spark plug has a center electrode and an adjacent electrode separated by a gap, and further has a plurality of spaced-apart retractable electrodes, each retractable electrode being disposed circumferentially of the center electrode, the retractable electrodes being elevated when the engine is to be started and being retracted after the engine has become warm.

8. The method of claim 1, wherein the engine has a fuel injector and the heated fuel is introduced into the cylinder.

9. The method of claim 1, wherein the engine has a carburetor and the fuel is heated before being introduced into the carburetor.

10. The method of claim 1, wherein the heating means is an electrical resistance through which electrical current is passed together with a plurality of spark plugs, one in each cylinder generating a spark within the cylinders.

11. The method of claim 1, wherein the heating means is a plurality of glow plugs, one glow plug disposed in each cylinder.

12. The method of claim 1, further comprising the step of discontinuing the heating of the fuel in the fuel path after the engine has become warm.

13. In a vehicle, the combination of an engine, a fuel tank containing a petroleum-based fuel, the fuel having a relatively-high flash point of at least 100° F., such that the fuel is combustible but not flammable, a fuel line from the fuel tank to the engine, and means for heating the fuel in the fuel line without vaporizing the fuel prior to delivery of the fuel to the engine, thereby enabling a cold engine to be started, wherein a variety of vehicles having different fuel requirements may operate on the same relatively-high flash point fuel, thereby substantially reducing logistical and storage problems, and thereby substantially eliminating the potential for fire hazards occasioned by the use of gasoline which has a relatively low flash point.

14. The combination of claim 13, further including means for monitoring the temperature of the engine and for thereby cutting off the means for heating the fuel in the fuel line at a predetermined engine temperature such that the engine, when warm, will continue to run on the relatively-high flash point fuel.

\* \* \* \* \*